(12) United States Patent
Magocs

(10) Patent No.: US 6,568,812 B2
(45) Date of Patent: May 27, 2003

(54) SYSTEM FOR MOUNTING INFRARED RECEIVER BEHIND MIRROR IN REAR PROJECTION TELEVISION APPLICATIONS

(75) Inventor: Stephen Magocs, Knoxville, TN (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/896,501

(22) Filed: Jun. 29, 2001

(65) Prior Publication Data

US 2003/0002018 A1 Jan. 2, 2003

(51) Int. Cl.[7] .................. G03B 21/00; G03B 21/22; H04N 9/24
(52) U.S. Cl. .................. 353/42; 353/77; 353/122; 348/813
(58) Field of Search .................. 348/734, 779, 348/782, 813; 353/77, 98, 122, 29, 42

(56) References Cited

U.S. PATENT DOCUMENTS

| | | | | | |
|---|---|---|---|---|---|
| 4,431,258 | A | * | 2/1984 | Fye | 359/129 |
| 5,235,363 | A | * | 8/1993 | Vogeley et al. | 353/122 |
| 5,557,343 | A | * | 9/1996 | Yamagishi | 348/756 |
| 5,612,753 | A | * | 3/1997 | Poradish et al. | 348/743 |
| 5,896,236 | A | * | 4/1999 | Lostumo et al. | 348/782 |
| 2001/0015793 | A1 | * | 8/2001 | Fujita et al. | 353/74 |

* cited by examiner

Primary Examiner—Russell Adams
Assistant Examiner—Andrew Sever

(57) ABSTRACT

A system for mounting an infrared (IR) remote control receiver in a rear projection television apparatus features a mirror having a coating wherein visible light is reflected to a viewing device, and light in the infrared regions is passed through the mirror and detected by an IR receiver mounted behind the mirror.

16 Claims, 2 Drawing Sheets

SYSTEM FOR MOUNTING INFRARED RECEIVER BEHIND MIRROR IN REAR PROJECTION TELEVISION APPLICATIONS

FIELD OF THE INVENTION

This invention relates to the field of projection televisions (PTV), and more particularly to a system for mounting infrared receivers in a PTV.

BACKGROUND OF THE INVENTION

When an infrared (IR) remote control device is used with a rear projection television (PTV) set, a receiving IR device is typically mounted either on an area of a front panel near the edge of a focusing lens assembly, or at the bottom of a reflecting mirror. The selection of a specific location is made to provide a line-of-sight path from the IR receiver to a viewer's controlling device. However, to preserve controller battery life, the transmission path is minimized, thereby providing a sufficiently strong received signal for a given transmitted power.

Disadvantageously, such an arrangement occupies front panel surface area. This forces a chassis size to be larger than necessary to accommodate the IR receiver sensing element in a typically esthetically-pleasing arrangement within the overall PTV enclosure. To compensate for this impact on chassis size, the target area of the receiving sensor is typically reduced, thereby reducing the received signal power.

SUMMARY

A rear projection television (PTV) system employing a reflecting mirror for redirecting an image to be projected, wherein the mirror is fabricated with a coating material having dual light properties according to a preferred embodiment of the present invention. With the dual properties comprising a high reflectivity property to incident visible light beams (wavelengths<790 nm) and a transparency property to IR light beams (wavelengths>790 nm), an IR receiver element can be positioned behind the mirror rather than on a front panel of the PTV. In addition, a fresnel lens used for focusing the created image can also concentrate the incident IR beam to provide for a stronger received IR signal than would otherwise be possible.

DETAILED DESCRIPTION OF THE INVENTION

Figure 1:
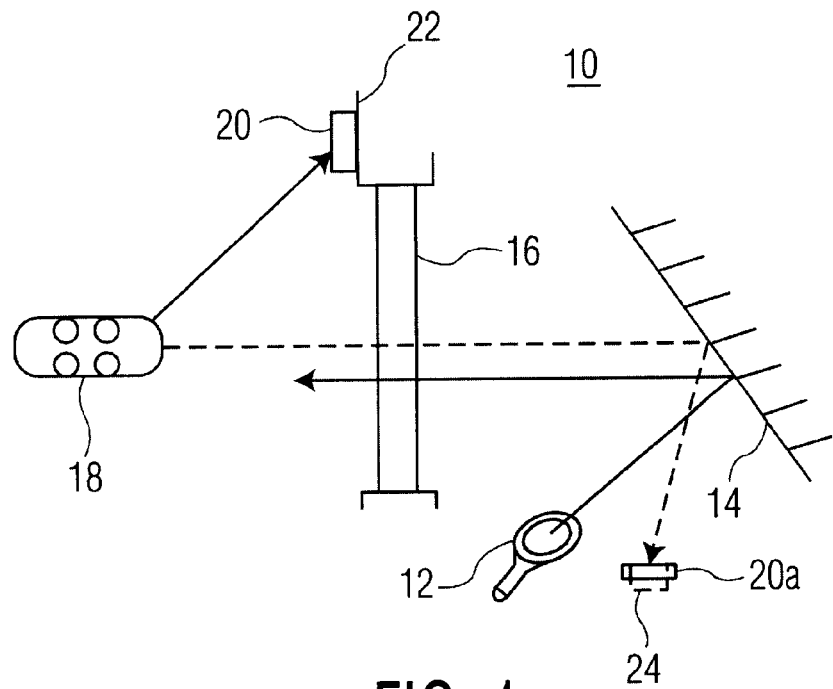
FIG. 1 shows a conventional projection television (PTV) system indicating exemplary locations for a remote control infrared (IR) receiver.

FIG. 1 shows a conventional rear projection television (PTV) system 10 having a lighted image source 12, such as a cathode ray tube (CRT), that directs a visible light beam to a planar mirror 14, where the beam is redirected to a target plane either on a focusing fresnel lens 16 or onto a display screen (not shown). Typically, such a system 10 has an infrared (IR) remote control apparatus consisting of a remote user interface device 18 having an IR transmitter in communication with an IR receiving device 20. IR receiving device 20 is typically located on a front surface of a chassis of a rear PVT apparatus 22, to ensure a maximum strength line-of-sight signal at a sensor of IR receiving device 20.

Alternative mounting locations for IR receiving device 20 in a rear PTV apparatus 22 can also be inside the chassis at a location 24 where the IR signal can be reflected to an IR receiving device 20a by planar mirror 14. While such a redirected IR configuration presents a longer signal path, and thus a weaker IR signal, than a front panel mounting arrangement, it has an added advantage in that the chassis does not require external esthetic modification to accept IR receiving device 20. A primary design consideration is the ability to provide a strong enough IR signal at IR receiving device 20 when remote interface device 18 is not directly in front of the PTV apparatus 22. Since an angle of incidence on planar mirror 14 will be the angle of reflection, the reflected beam will not typically align the center of an IR beam onto IR receiving device 20a, further degrading the ultimate received IR signal.

Figure 2:
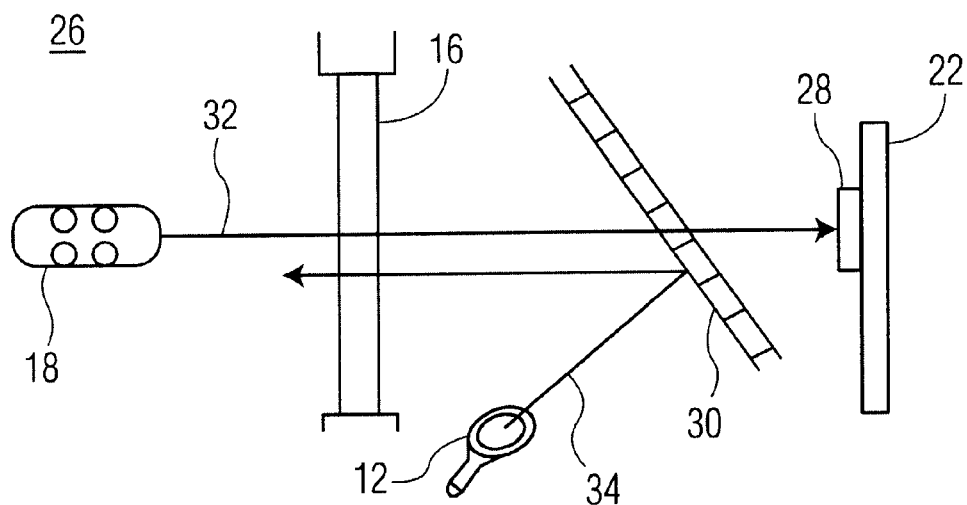
FIG. 2 shows a PTV system indicating an exemplary location for a remote control infrared (IR) receiver according to a preferred embodiment of the present invention.

FIG. 2 shows a PTV system 26 indicating an exemplary location for a infrared (IR) receiver 28 according to a preferred embodiment of the present invention. By modifying the coating of a planar mirror 30, an IR wavelength beam 32 from remote interface device 18 can pass through the planar mirror 30, while a visible wavelength beam 34 from the CRT 12 can be reflected to a target plane or fresnel lens 16. Such a semi-reflecting planar mirror 30 allows IR receiving device 28 to be positioned and mounted behind planar mirror 30. Thus, an IR beam received at IR receiving device 28 would be independent of an incident transmission angle, since all incoming IR beams will have a direct line-of-sight path to IR receiving device 28.

IR receiving device 28 can be mounted in a variety of ways behind planar mirror 30, and, since no particular esthetic considerations are required, a significant reduction in parts count, assembly time, and cost can be realized. An exemplary mounting arrangement could be a molded plastic frame secured to chassis frame of the PTV apparatus 22.

The reflective coating of planar mirror 30 would preferably have a spectral transmission/absorption characteristic that provides 1) a high reflectivity surface to light wavelengths below an exemplary wavelength $\lambda$ of 790 nanometers (nm) and 2) a transparent medium for infrared wavelengths above that exemplary 790 nm wavelength. For example, below 790 nm the reflectivity could be approximately 90% and the transmission approximately 10%, whereas above 790 nm the reflectivity could be approximately 15% and the transmission approximately 85%. Such a mirror is known in the art as a "cold mirror." Alternative wavelengths can be used as the partition between the visible light and the communications IR link, for example, 600 nm, 900 nm, or 1200 nm wavelengths.

Fabrication of such a cold mirror consists of coating a generally transparent material, such as glass or plastic, said coating being deposited on at least one of the major planar surfaces, said coating further consisting of a material which is one or more compounds from the exemplary group consisting of titanium oxide, silicon dioxide and tantulum oxide. The finished semi-reflective planar element would be positioned in the light path between the lighted image source 12 and the target plane as shown in FIG. 2.

An added benefit of having fresnel lens 16 serving as the target plane for visible light beam 34 in FIG. 2 and in the radiation path for IR signal 32, is that fresnel lens 16 would also concentrate incoming IR beam 32. This concentration increases the energy density at IR receiving element 28, thus, allowing for lower energy usage. Further, since visible light both from the CRT and other external light sources includes some IR radiation, baffles may be used to minimize any degradation effects of such unwanted beams.

Figure 3:
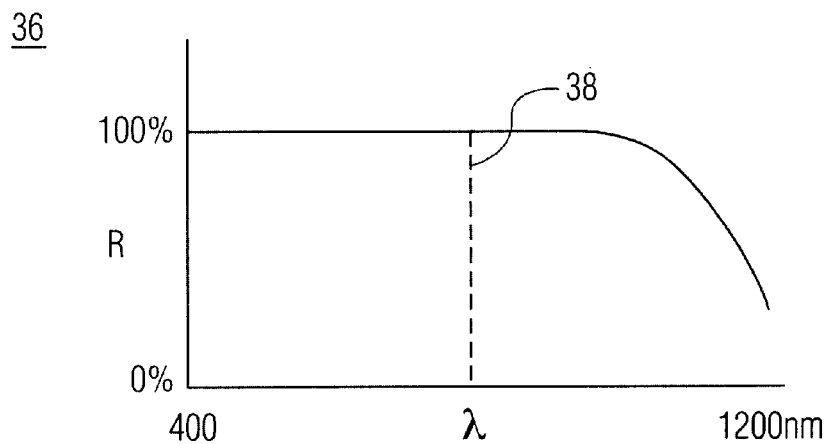
FIG. 3 shows a plot of the reflectivity vs. wavelength for an incident light beam for a conventional mirror.

FIG. 3 shows a plot 36 of the reflectivity vs. a wavelength of an incident light beam for a conventional mirror. Dotted line 38 represents a wavelength of 790 nm, which will be an exemplary partition point for FIGS. 4 and 5. A natural attenuation of the plot occurs above 1200 nm.

Figure 4:
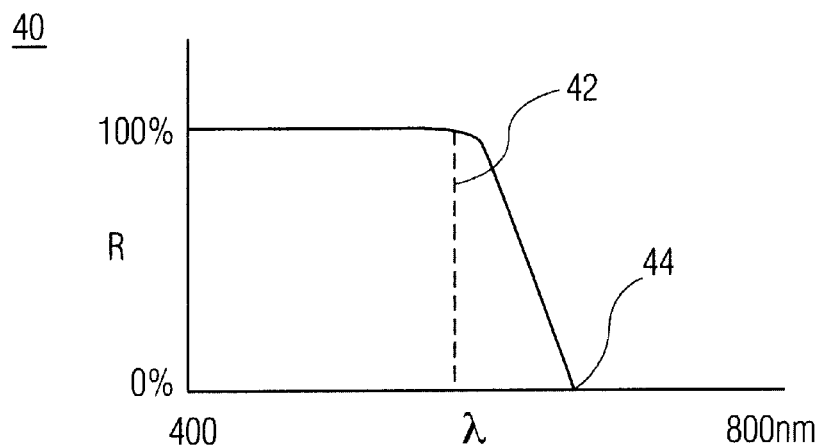
FIG. 4 shows a plot of the reflectivity vs. wavelength for an incident light beam for a mirror coated according to a preferred embodiment of the present invention.

FIG. 4 shows a plot 40 of the reflectivity vs. a wavelength of an incident light beam for a mirror coated according to a preferred embodiment of the present invention. A clear demarcation begins a roll-off at point 42, so that the reflectivity of the planar element of the present invention is essentially eliminated for wavelengths above 790 nm at point 44.

Figure 5:
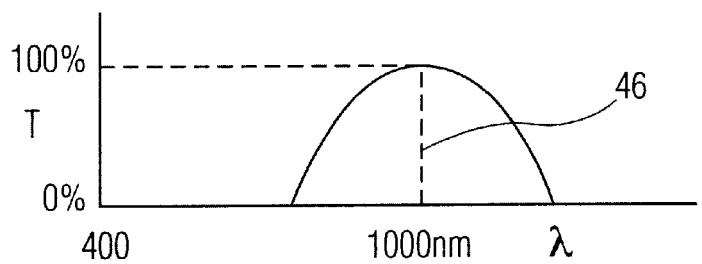
FIG. 5 shows a plot of the transmissivity of the mirror of FIG. 3 vs. wavelength for the incident beam of light.

FIG. 5 shows a plot of the transmissivity of the mirror of FIG. 2 vs. wavelength for an incident beam of light. The practical effect is to merge the plot shown in FIG. 3 with the plot shown in FIG. 4, yielding a generally gaussian curve centered on a wavelength of 1000 nm.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the embodiments may be varied without departing from the spirit of the invention, and the exclusive use of all modifications which come within the scope of the appended claims is reserved.

What is claimed is:

1. A rear projection television (PTV) system that can be remotely operated by a user, comprising:
   a lighted image source for creating an image;
   a target plane for displaying the created image to the user;
   an IR receiving element; and
   a planar element that reflects a first plurality of wavelengths of light and transmits a second plurality of wavelengths of light including lit radiation,
   the planar element being disposed to reflect the created image to the target plane,
   the IR receiving element being disposed to receive commands from the user that are transmitted through the planar element.

2. The system of claim 1, wherein the lighted image source comprises a cathode ray tube (CRT).

3. The system of claim 1, wherein the first plurality of wavelengths of light comprises wavelengths that are less than 790 nanometers in length.

4. The system of claim 1, wherein the second plurality of wavelengths of light comprises wavelengths that are greeter than 790 nanometers in length.

5. The system of claim 1, wherein the planar element comprises a generally transparent material having a coating deposited on a planar surface.

6. The system according to claim 5, wherein the transparent material is glass.

7. The system according to claim 5, wherein the coating material is a compound selected from the group consisting of titanium oxide, silicon dioxide and tantulum oxide.

8. The system of claim 1, wherein the planar element is positioned in a light path between the lighted image source and the target plane.

9. The system of claim 1, wherein the focusing structure is positioned in a light path between the lighted image source and the target plane.

10. The system of claim 1, wherein the focusing structure comprises a fresnel lens.

11. The system according to claim 10, wherein the target plane is the fresnel lens.

12. The system of claim 1, wherein the IR receiving element is positioned such that the planar element is located between the IR receiving element and an IR transmitter of a remote control apparatus.

13. The system of claim 1, wherein the IR receiving element is positioned such that the target plane is located between the IR receiving element and an IR transmitter of a remote control apparatus.

14. The system of claim 1, wherein the IR receiving element is positioned such that the focusing structure is located between the lit receiving element and an IR transmitter of a remote control apparatus.

15. A method for remotely controlling a rear projection television system, comprising:
   projecting an image from a lighted image source;
   reflecting the projected image from a planar element to a target plane;
   displaying the reflected image at the target plane; and
   controlling the system by transmitting user commands that pass through the planar element and are received at a remote control receiver located behind the planar element.

16. The method of claim 15, wherein controlling the system includes transmitting the commands to the remote control receiver by passing them through both the target plane and the planar element to reach the remote control receiver.

* * * * *